United States Patent
Branca

(10) Patent No.: US 10,001,990 B2
(45) Date of Patent: Jun. 19, 2018

(54) METHOD AND SYSTEM FOR ENHANCING APPLICATION CONTAINER AND HOST OPERATING SYSTEM SECURITY IN A MULTI-TENANT COMPUTING ENVIRONMENT

(71) Applicant: IOMAXIS, LLC, Springfield, VA (US)

(72) Inventor: David L. Branca, Springfield, VA (US)

(73) Assignee: IOMAXIS, LLC, Springfield, VA (US)

( * ) Notice: Subject to any disclaimer, the term of this patent is extended or adjusted under 35 U.S.C. 154(b) by 28 days.

(21) Appl. No.: 15/794,363

(22) Filed: Oct. 26, 2017

(65) Prior Publication Data

US 2018/0046457 A1    Feb. 15, 2018

(51) Int. Cl.
*G06F 21/56* (2013.01)
*G06F 9/445* (2006.01)
(Continued)

(52) U.S. Cl.
CPC .............. *G06F 8/77* (2013.01); *G06F 11/008* (2013.01); *G06F 11/3616* (2013.01);
(Continued)

(58) Field of Classification Search
CPC .... G06F 9/45558; G06F 21/35; G06F 21/564; G06F 21/577; H04L 63/20; H04L 63/1433; H04L 63/1441
See application file for complete search history.

(56) References Cited

U.S. PATENT DOCUMENTS

| | | | |
|---|---|---|---|
| 7,096,503 B1 * | 8/2006 | Magdych | G06F 21/577 713/189 |
| 7,315,842 B1 * | 1/2008 | Wang | G06Q 40/00 705/38 |

(Continued)

OTHER PUBLICATIONS

Aaron Grattafiori, Understanding and Hardening Linux Containers, Jun. 29, 2016, [Retrieved on Jan. 2, 2018]. Retrieved from the internet: <URL: https://www.nccgroup.trust/.../ncc_group_understanding_hardening_linux_containers-1> 123 Pages (1-123) (Year: 2016).*

(Continued)

*Primary Examiner* — Anibal Rivera
(74) *Attorney, Agent, or Firm* — RatnerPrestia

(57) ABSTRACT

A system for application container security comprising an application container processing and deployment computer system configured to receive an application container, determine operating system kernel requirements of the application container, calculate a risk value based on the operating system kernel requirements of the application container, determine availability of a host computer to host the application container, by determining if the operating system kernel of the host computer meets operational requirements of the application container. The operational requirements including the risk value for the application container. When the operating system kernel of the host computer is determined to meet the operational requirements, pair the application container with the operating system kernel of the host computer. When the operating system kernel of the host (Continued)

computer is determined to not meet the operational requirements, configure and compile a container-specific operating system kernel that meets the operational requirements.

16 Claims, 7 Drawing Sheets

(51) Int. Cl.
| | |
|---|---|
| *G06F 21/57* | (2013.01) |
| *G06F 9/44* | (2006.01) |
| *G06F 21/12* | (2013.01) |
| *G06F 11/36* | (2006.01) |
| *G06F 11/00* | (2006.01) |
| *G06F 21/35* | (2013.01) |

(52) U.S. Cl.
CPC .......... *G06F 21/126* (2013.01); *G06F 21/564* (2013.01); *G06F 21/35* (2013.01); *G06F 21/577* (2013.01)

(56) References Cited

U.S. PATENT DOCUMENTS

| | | | | |
|---|---|---|---|---|
| 9,317,692 | B2* | 4/2016 | Elder | H04L 63/1433 |
| 9,519,780 | B1* | 12/2016 | Dong | G06F 21/564 |
| 9,642,822 | B2* | 5/2017 | Wagner | A61K 31/166 |
| 2004/0033621 | A1* | 2/2004 | Kennedy | G01N 33/558 |
| | | | | 436/514 |
| 2007/0283145 | A1* | 12/2007 | Gressel | G06F 21/35 |
| | | | | 713/164 |
| 2008/0113332 | A1* | 5/2008 | Keller | G01N 33/57434 |
| | | | | 435/4 |
| 2011/0112968 | A1* | 5/2011 | Florek | G06Q 20/20 |
| | | | | 705/50 |
| 2014/0189873 | A1* | 7/2014 | Elder | H04L 63/1433 |
| | | | | 726/25 |
| 2014/0199329 | A1* | 7/2014 | Wagner | A61K 45/06 |
| | | | | 424/172.1 |
| 2014/0215617 | A1* | 7/2014 | Smith | H04L 63/1441 |
| | | | | 726/23 |
| 2014/0371081 | A1* | 12/2014 | Badve | G01N 33/57407 |
| | | | | 506/9 |
| 2016/0005029 | A1* | 1/2016 | Ivey | G09C 1/00 |
| | | | | 705/44 |
| 2017/0004302 | A1* | 1/2017 | Derbeko | G06F 9/45558 |
| 2017/0322815 | A1* | 11/2017 | Buswell | G06F 9/4406 |
| 2017/0344289 | A1* | 11/2017 | Jeong | G06F 3/0619 |
| 2017/0344361 | A1* | 11/2017 | Zhang | H04L 67/34 |
| 2017/0353496 | A1* | 12/2017 | Pai | H04L 63/20 |

OTHER PUBLICATIONS

Murugiah Souppaya et al., Application Container Security Guide, Sep. 2017, [Retrieved on Jan. 2, 2018]. Retrieved from the internet: <URL: http://nvlpubs.nist.gov/nistpubs/SpecialPublications/NIST.SP.800-190.pdf> 63 Pages (1-51) (Year: 2017).*

* cited by examiner

METHOD AND SYSTEM FOR ENHANCING APPLICATION CONTAINER AND HOST OPERATING SYSTEM SECURITY IN A MULTI-TENANT COMPUTING ENVIRONMENT

FIELD OF THE INVENTION

The present invention relates to application container and host operating system security in a multi-tenant computing environment. Specifically, this invention relates to enhancing application container and host operating system security in a multi-tenant computing environment by means of configuration risk evaluation of application containers and container-specific configured and compiled host operating system kernels in combination with the strategic pairing and provisioning of such application containers with host OS kernels.

BACKGROUND OF THE INVENTION

Operating system (OS) level virtualization is a method of virtualization that enables multiple isolated user-spaces instances (containers) within the same compute hardware environment to execute on a single host OS kernel. The host's OS kernel is shared with each container hosted on the system, enabling the containers to access and utilize compute resources (e.g. CPU, memory, storage, networking) concurrently. An application container is a software application that runs as a container in an operating system level virtualized environment. An application container executing in a virtual environment is known as "application containerization" or more simply as "containerization." For example, the application container image file encapsulates the software binary and supporting software libraries all into one deployable image file package. The ability to package software in an application container enables a modular approach to software development and deployment, and eliminates software compatibility issues that can arise from discrepancies between application software library version requirements and installed OS software library version.

In the whitepaper "Understanding and Hardening Linux Containers" prepared by Aaron Grattafiori, application container security is defined as the ability to restrict access to other containers, prevent knowledge of other containers from intentionally or accidentally leaking to one another, control and account for memory, CPU, networking, and disk I/O, and the ability to detect and remove rouge processes. Historically, containerization has posed a greater security risk as compared to hardware or platform virtualization. The risk inherent in containerization stems from the OS kernel being shared between multiple application containers, and the lack of constraints to prevent containers from escaping their confinement and accessing the host environment and/or the other containers within the host environment. Attacks against an application container or host system can originate from compromised containers, applications within containers, maliciously deployed containers, and an assortment of other sources.

Current advancements to address the security of application containers have focused on kernel namespaces and control groups. Kernel namespaces have been developed to isolate the global resources of a host to an application container's set of processes that are a member of the namespace. While the scope of namespaces continues to expand, it is not all-inclusive. For example, the audit program and the file system are not addressed by namespaces. There are also security weaknesses in the Mount namespace as discussed in detail by Richard Guy Briggs at the 2016 Linux Security Summit. Control groups have been developed to limit application containers access to various host hardware resources. Although useful, control groups can only limit what they are configured to limit. Even with the development of these security measures, gaps continue to exist in application container security that are yet to be addressed.

SUMMARY OF INVENTION

An embodiment includes a system for application container security. The system comprises an application container processing and deployment computer system configured to receive an application container including a software application and runtime environment files for supporting execution of the software application, determine operating system kernel requirements of the application container, calculate a risk value based on the operating system kernel requirements of the application container, determine availability of a host computer to host the application container, by determining if the operating system kernel of the host computer meets operational requirements of the application container. The operational requirements including the risk value for the application container. When the operating system kernel of the host computer is determined to be available by meeting the operational requirements, pair the application container with the operating system kernel of the host computer for execution of the software application. When the operating system kernel of the host computer is determined to be unavailable by not meeting the operational requirements, configure and compile a container-specific operating system kernel that meets the operational requirements of the application container, and pair the application container with the container-specific operating system kernel.

An embodiment includes a computer-implemented method for application container security, comprising the steps of receiving, by a processing and deployment computer system, an application container including a software application and runtime environment files for supporting execution of the software application, determining, by the processing and deployment computer system, operating system kernel requirements of the application container, calculating, by the processing and deployment computer system, a risk value based on the operating system kernel requirements of the application container, determining, by the processing and deployment computer system, availability of a host computer to host the application container, by determining if an operating system kernel of the host computer meets operational requirements of the application container, the operational requirements including the risk value for the application container. When the operating system kernel of the host computer is determined to be available by meeting the operational requirements for the application container, pairing, by the processing and deployment computer system, the application container with the operating system kernel of the host computer for execution of the software application. When the operating system kernel of the host computer is determined to be unavailable by not meeting the operational requirements for the application container, configuring, by the processing and deployment computer system, and compiling a container-specific operating system kernel that meets the operational requirements of the application container, and pairing, by the processing and deployment computer system, the application container with the container-specific operating system kernel.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures.

DETAILED DESCRIPTION OF THE INVENTION

Figure 1:
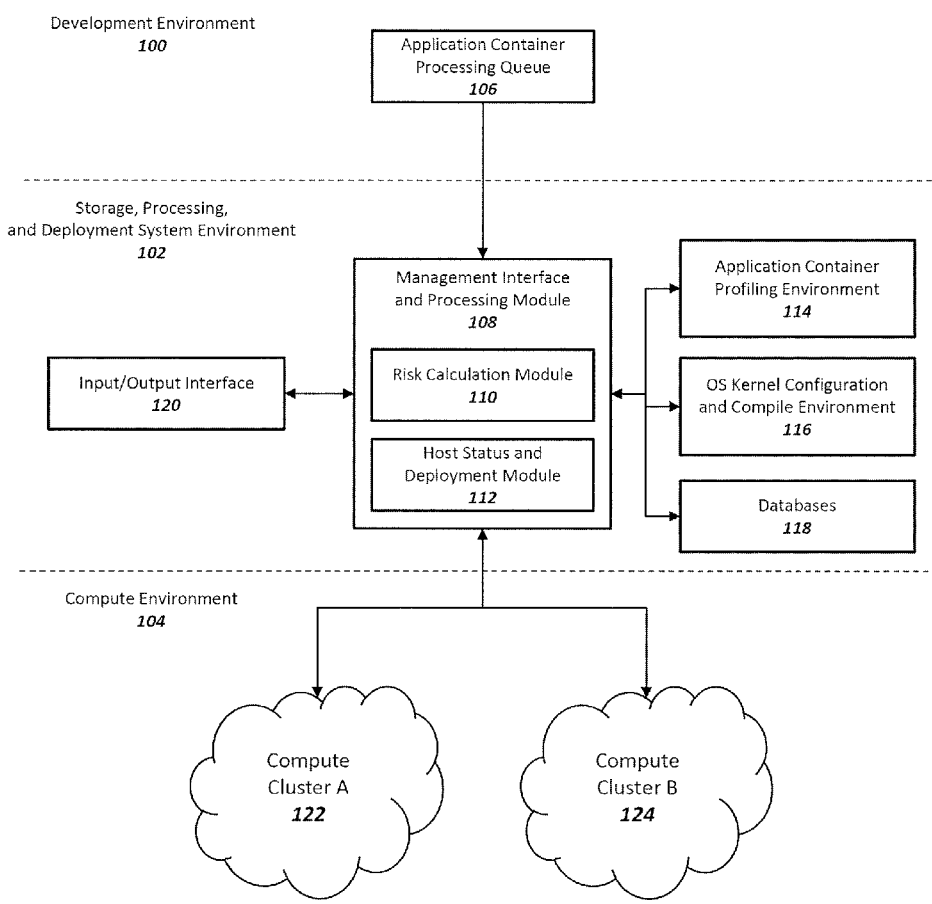
FIG. 1 is a macro-level diagram of a system for enhancing the security posture of an application container and host operating system in a multi-tenant computing environment in accordance with aspects of the invention.

Adoption of virtualized environments continues to increase while industry efforts have predominantly been focused on securing application containers. As resources are invested in reducing the attack surface of an application container, one of the most vulnerable components of the application container compute environment continues to be ignored: the host OS kernel. Little to no effort has been expended in building systems and methods that incorporate and implement application container and host OS kernel security measures in a holistic manner. There is also a deficiency in ability to measure application container risk, host OS kernel risk, and the effects each has on one another.

The host OS of a virtualized environment is a shared resource amongst hosted application containers. Therefore securing the OS kernel is an important component in container application security since the kernel provides the largest surface for attack and exploitation. Typical application container host machine deployments utilize general-purpose host OS kernels with all the kernel modules, drivers, capabilities, etc. installed and available. A majority of users do not fine-tune a host OS kernel's interfaces, resources, and overall configuration to support an application container's specific compute requirements. In other words, general-purpose OS kernels are deployed to support application containers with more components, modules, and capabilities available than what might actually be required. For example, a kernel configuration includes a video card driver module, but the operating system runs on a server that does not use a graphical user interface—it may only use the command line interface, and the application container requires no video card drivers. The inclusion of the video card hardware driver does not impact the operation of the OS or the function of a hosted application container, but since it is included, it provides an additional entry point into the host system OS kernel for which a nefarious actor can exploit. This type of attack focuses on components of the OS kernel that are available yet might not be used. Additionally, including unnecessary software modules with the OS kernel increases the probability of introducing unaddressed software bugs and zero days into the system, inadvertently increasing the attack surface of the host OS kernel and overall risk of the environment. Therefore, it is desirable to have a solution that couples the application container to specifically tuned interfaces and resources provided by the host OS kernel, delivering only the necessary interfaces and resources to the application container.

The ability to effectively configure, compile, and deploy a custom, container-specific, host OS kernel for an individual application container is hindered by the lack of automated processes for determining what an application container's functional requirements are, and an automated process for configuring, compiling, and installing a custom OS kernel to hardware. In addition, there is no system for analyzing an application container's functional requirements, and identifying an already deployed OS kernel with a matching minimalist kernel build configuration that can support the individual application container. It is important that specific application container security solutions continue to be developed, but improving kernel safeguards is also important to reduce the attack surface while a holistic approach to pairing application containers with purposefully configured host OS kernels is required. When the state of an application container and the state of a host OS kernel are known, the risk each poses to the other and the composite system as a whole can be quantified. The quantification of risk can then be used as a parameter for determining the impact an individual application container has on a compute environment—enabling smarter application container deployments that maintain or reduce the overall risk of a compute environment, improving the operational security posture.

Well-informed and intelligent deployment decisions of application containers and host OS kernels that reduce environment and system risk do not occur organically. Currently, the operational risk of an application container and host OS system pairing is not considered, and the ability to intelligently provision an application container to a host with the least amount of risk does not exist. The risk associated with the coupled interaction between application container and host OS may be calculated and evaluated to provide objective intelligence to aid in the determination of the operational risk levels present within a compute environment. Thus, there is a need to understand and measure the requirements of an application container, build container-specific OS kernels that match application container's requirements (i.e. resource availability and risk tolerances), and strategically pair and deploy application containers with host OS kernels that may or may not be hosting other application containers. This holistic approach enhances the operational security posture of the application container, host OS kernel, and the system as a whole while providing quantitative insight with regards to risk.

FIG. 1 is a macro-level diagram of a system for enhancing the security posture of an application container and host operating system in a multi-tenant computing environment. The illustrated system is segmented into three environments: a development environment 100, a storage, processing, and deployment system environment 102, and a compute environment 104. Each of the three environments encompasses the different stages and components of the application container development, processing, and deployment phases. Specifically, the development environment 100 (e.g. one or more computers) supports the initial build process of an application container, while the storage, processing, and deployment system environment 102 (e.g. one or more computers) is where application containers and new host OS kernels are processed. The compute environment 104 (e.g. one or more computers) represents the environment where host OS kernels are installed and processed application containers are deployed for operational use.

The development environment 100 hosts the application container processing queue 106, which provides the mechanism for application containers to enter the system for processing and deployment. The application container processing queue 106 is associated with the management interface and processing module 108 of the storage, processing, and deployment system environment 102. The management interface and processing module 108 includes the risk calculation module 110, and the host status and deployment module 112. Also associated is the application container profiling environment 114, OS kernel configuration and compile environment 116, and the databases 118. In one embodiment, the management interface and processing module 108 is coupled with the overall system components illustrated in FIG. 1. This enables the management interface and processing module 108 to manage and orchestrate the other components of the system. The input/output interface 120 provides a user access for interacting with the system. Application containers and new host OS kernels are deployed to available resources of compute cluster A 122 and compute cluster B 124 of the compute environment 104. The components of FIG. 1 are further detailed in FIG. 2.

It should be noted that development environment 100, storage, processing, and deployment system environment 102, and compute environment 104 may be owned by different entities or the same entity.

In a first example, the development environment 100 may be owned by a software application developer, the storage, processing, and deployment system environment 102 may be owned by a company providing the application container security services, and the compute environment 104 may be owned by an internet service provider. In this first example, the software developer would develop an application container and send the application container to the security company. The security company would perform the security protocol (e.g. intelligently match the application container with an appropriate operating system kernel) and then deploy the container to the internet service provider network.

In a second example, the development environment 100, the storage, processing, and deployment system environment 102, and the compute environment 104 may all be owned by a single company. In this second example, the software development, the security protocol (e.g. intelli-gently matching the application container with an appropriate operating system kernel), and deployment of the application container would all be performed by the one company.

Figure 2:
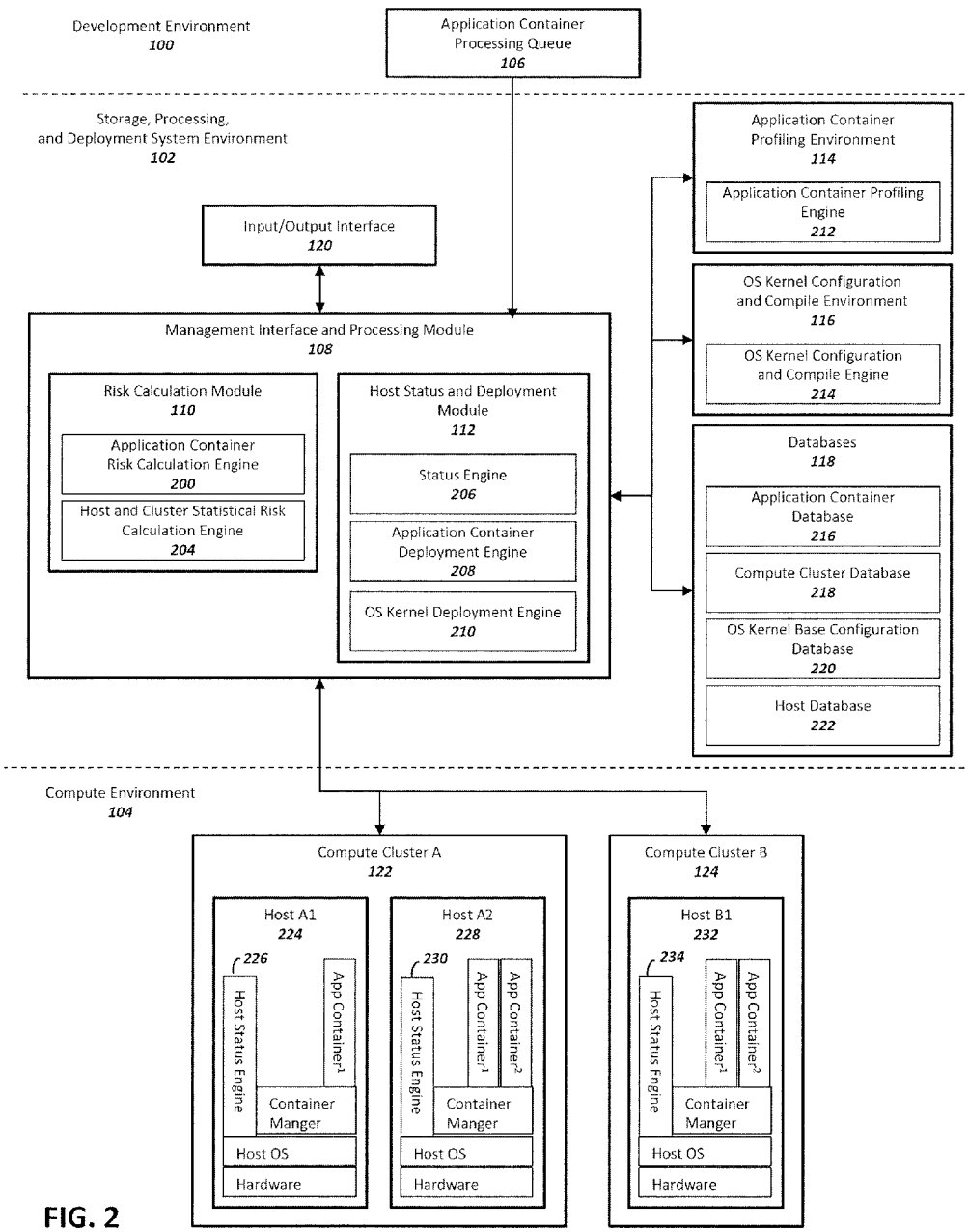
FIG. 2 is micro-level diagram further detailing the components of the system depicted in FIG. 1 in accordance with aspects the invention.

FIG. 2 is a micro-level diagram of the system depicted in FIG. 1. Components of the development environment 100, storage, processing, and deployment system environment 102, and compute environment 104 run on independent physical hardware infrastructure that may be a conventional computing system, such as a server, desktop, laptop, IoT device, or other system including a processor. The development environment 100 and storage, processing, and deployment system environment 102 can function in a non-virtualized or virtualized system environment. The compute environment 104 includes at least one un-configured piece of hardware and/or at least one piece of hardware with a hypervisor/operating system installed and configured to specifically support application containerization. The compute environment 104 can be a single host, multiple hosts, or a public, private, or hybrid cloud computing environment. Suitable hardware and virtualized software infrastructures will be understood by one of skill in the art from the description herein.

In one embodiment, the compute environment 104 is illustrative of two separate cloud computing environments: compute cluster A 122 and computer cluster B 124. For purpose of example, compute cluster A 122 is comprised of host A1 224 and host A2 228 while computer cluster B 124 is comprised of host B1 232. Each host stack includes hardware, a host OS, application container management software, and a host status engine 226, 230, 234. The host status engines 226, 230, 234 are further described later in detail with reference to FIG. 5.

The input/output interface 120 is configured to present data and/or reports to a user in a user-readable format and to receive inputs (e.g., user actions, configuration specifications, host kernel compile parameters, application, host and cluster system risk values, etc.) from a user when necessary to facilitate operation of the system. The input/output interface 120 of the storage, processing, and deployment system environment 102 may be coupled to the development environment 100 and/or the compute environment 104. The input/output interface 120 may be a monitor and keyboard, mobile device (e.g., cellular phone, smart phone), tablet device, etc. In one embodiment, the input/output interface 120 is configured to be wirelessly connected (e.g., via Bluetooth, cellular network, WiFi, etc.) to the system. Other suitable input/output interfaces for the system will be understood by one of skill in the art from the description herein.

Multiple application container processing queues 106 can reside and operate concurrently in one or more development environments 100. For example, one storage, processing, and deployment system environment 102 can connect and manage multiple container processing queues 106 that are deployed across multiple development environments 100. The scalable design enables the system to support multiple users, projects, regional office locations, customers, etc. and provide separation of development environments for management and security purposes. In one embodiment, the application container processing queue 106 of the development environment 100 connects to the management interface and processing module 108 of the storage, processing, and deployment system environment 102 using a wired and/or wireless data network connection. Queued application container image files in the application container processing queue 106 of the development environment 100 are securely transferred to the management interface and processing module 108 using secure network communication technologies and methodologies understood by one of skill in the art from the description herein. The methodology of how an application container is processed through the system is further described later in detail with reference to FIGS. 3, 4, 6, and 7.

The risk calculation module 110 and the host status and deployment module 112 further detail the composition of the management interface and processing module 108. The risk calculation module 110 is comprised of the application container risk calculation engine 200, and the host and cluster statistical risk calculation engine 204. The host status and deployment module 112 is comprised of the status engine 206, application container deployment engine 208, and the OS kernel deployment engine 210. Each one of these components is further described later in detail with reference to FIGS. 3, 4, 6, and 7.

The management interface and processing module 108 directly utilizes the application container profiling environment 114 and the OS kernel configuration and compile environment 116. The application container profiling environment 114 processes and profiles application container image files using the application container profiling engine 212. The OS kernel configuration and compile environment 116 custom configures and complies OS kernels using the OS kernel configuration and compile engine 214. In an embodiment, the application container profiling environment 114 and the OS kernel configuration and compile environment 116 are hosted independently on separate operating systems running on dedicated hardware separate from the management interface and processing module 108. These computer systems are specifically configured to support the application container profiling engine 212 and the OS kernel configuration and compile engine 214. Descriptions of how these two environments and their associated engines are utilized within the system are further described later in detail with reference to FIGS. 4, and 6.

Managing and storing all the data used in the system are databases 118. The databases 118 include at least the application container database 216, the compute cluster database 218, the OS kernel base configuration database 220, and the host database 222. These databases support the basic requirements of the system for organizing and maintaining the data used by the system. The databases 118 are directly connected to, and accessed by, the management interface and processing module 108 which also orchestrates all the data transfers between the databases 118 and the other the system components. The different types of data stored in the databases 118, and how the data is used by the system components is further described later on with reference to FIGS. 4, 5, 6, and 7.

Figure 3:
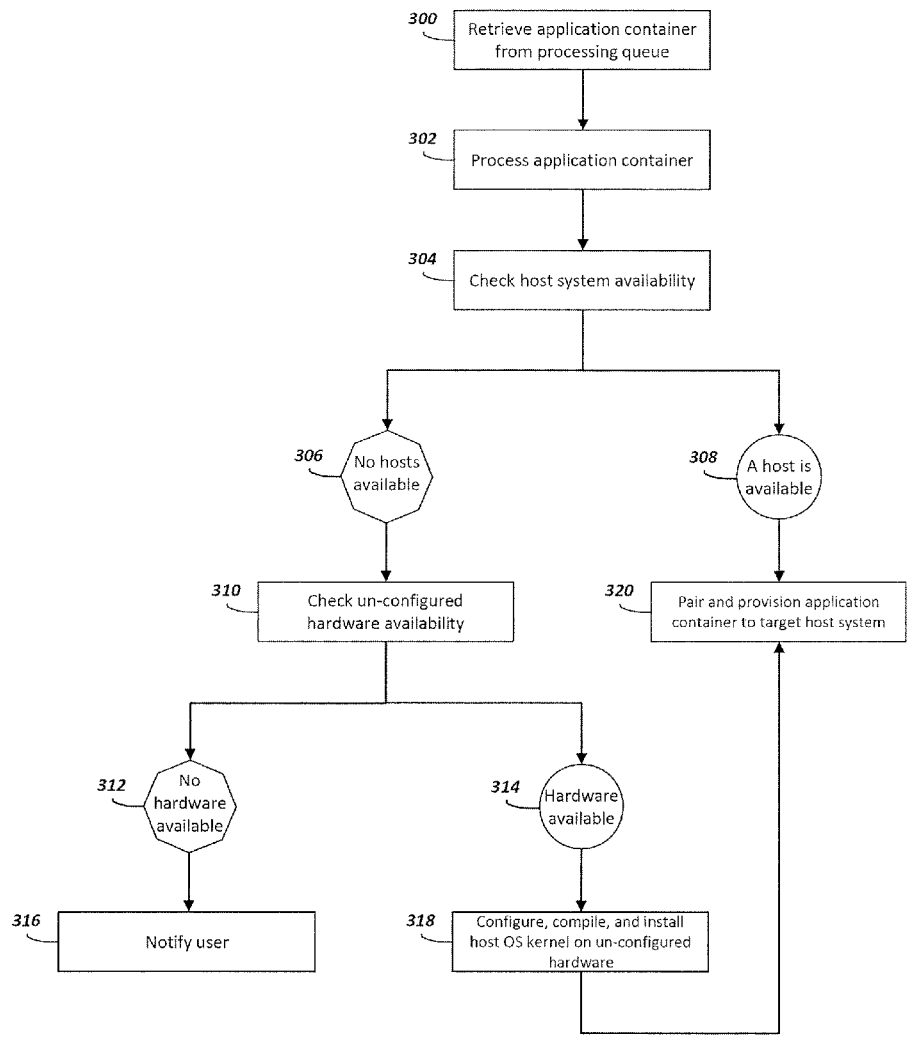
FIG. 3 is a macro-level flowchart of the procedure for processing an application container, analyzing host system and un-configured hardware availability, configuring, compiling and installing a host OS kernel, and/or intelligently pairing and provisioning an application container to a host OS kernel in accordance with aspects of the invention.

FIG. 3 is a high-level flowchart illustrating a method of processing and deploying an application container for operational use. The method starts at block 300, when an application container that has been developed, configured, vetted, and approved for operational use is submitted to the application container processing queue 106. Once submitted for processing, the application container is electronically and securely retrieved from the application container processing queue 106 by the management interface and processing module 108. At block 302, the application container is processed and profiled in the application container profiling environment 114. The processing and profiling of the application container generates information that is required later on to determine if there is an existing host with an OS kernel configuration installed that can support the application container, or if a new container-specific OS kernel is required to be configured, complied, and installed on un-configured hardware in order to support the application container. Additionally, user defined risk tolerance parameters are defined at this block for later use in host system selection. Block 302 is further described later on with reference to FIG. 4.

At block 304, the availability of configured host systems that match the application container's configuration requirements (e.g. OS kernel requirements) while providing an environment whose operational risk is within specification of the application container is ascertained. Host system assessment and availability verification includes the evaluation of currently installed operational host OS kernel configurations, resource availability, and risk ratings (i.e. risk value) acceptability within scope of the application container's requirements for operational deployment and functionality. As depicted in FIG. 3, the examination of host system availability results in either one of two outcomes: block 306 where no hosts are identified as available, or block 308 where at least one host is identified as available. Block 304 is further described later on with reference to FIG. 5.

At block 306, it has been determined that there are no hosts available to pair and provision the application container with that match the application container's requirements for kernel configurations, resource availability, and risk ratings acceptability (i.e. risk value). Once it is determined that no hosts are available for deploying the application container, the availability of un-configured hardware within the compute environment 104 is assessed. At block 310, the availability of un-configured hardware is determined. As depicted in FIG. 3, the investigation of un-configured hardware availability results in either one of two outcomes: block 312 where it is identified that no un-configured hardware is available, or block 314 where un-configured hardware is identified as available. Where block 312 is true because no un-configured hardware is available, the user of the system is notified as illustrated with block 316. Concurrently, the application container deployment process halts until a current host resource becomes available, or a new un-configured hardware for installing an OS kernel and provisioning the application container become available, or the user terminates the deployment of the application container. Block 310 is further described later on with reference to FIG. 5.

Where block 314 is true, un-configured hardware within the compute environment 104 has been identified as available. The process continues at block 318 when a new host OS kernel matching the application container's required specifications (e.g. application container's requirements for kernel configurations, resource availability, and risk value) is configured and complied by the OS kernel configuration and compile environment 116. Once the new host OS kernel is compiled, it is installed on the available un-configured hardware by the OS kernel deployment engine 210. Block 318 is further described later on with reference to FIG. 6.

In the method described herein, when a satisfactory host is identified as available for deployment of the application container as depicted by block 308, or when a satisfactory host is not initially available and the installation of a new host OS kernel on available un-configured hardware has occurred, providing a new host for the application container to be paired with and deployed to as depicted by block 318, the application container can be deployed to the compute environment 100. Block 320 encompasses the method for pairing and provisioning of the application container to the available host system. The application deployment engine 208 conducts the actual deployment of the application container to the host system. Block 320 is further described later on with reference to FIG. 7.

Figure 4:
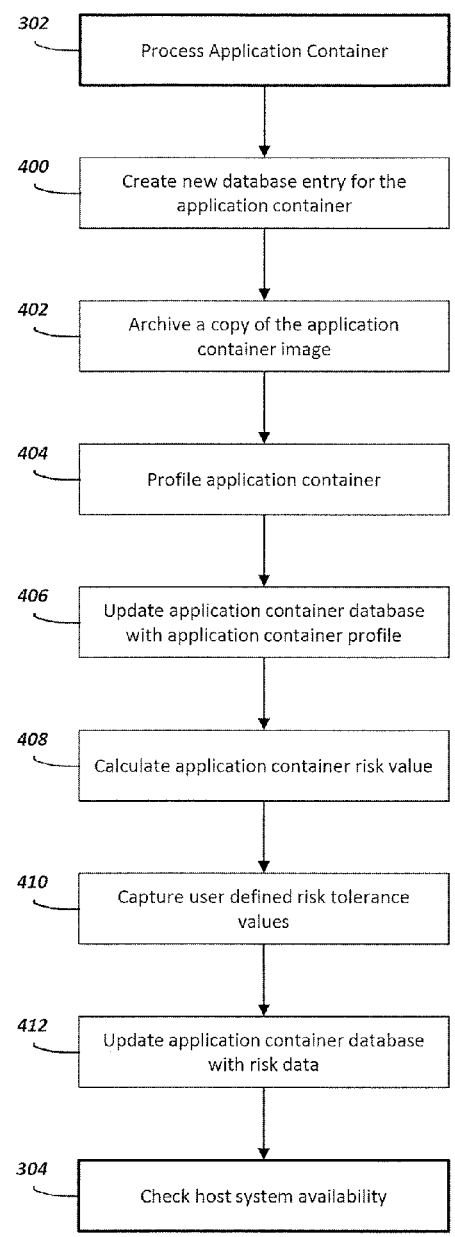
FIG. 4 is a flowchart further detailing the procedure for processing an application container as depicted in FIG. 3 in accordance with aspects of the invention.

FIG. 4 is a flowchart detailing the steps of block 302 for processing an application container. At block 400, an application container from the development environment 100 is retrieved from the application container processing queue 106 by the management interface and processing module 108. Upon retrieval, a new entry in the application container database 216 is created. Next at block 402, a copy of the application container image file is archived in the application container database 216. At block 404, the application container is profiled. To profile the application container, the application container is provisioned in the application container profiling environment 114 by the application container deployment engine 208. The application container profiling environment 114 is a fully functioning host machine with all OS kernel modules, drivers, capabilities, etc. installed and enabled. This configuration enables the application container profiling environment 114 host machine to run the application container without any restraints. When the application container is running in the application container profiling environment 114, the application container profiling engine 212 manages and evaluates the functionality and operation of the application container. During a simulated operational workload, a profile of the application container is generated by the application container profiling engine 212. The profile includes information specific but not limited to: the system calls made, types of network protocols used, processes started, memory utilization, file system requirements, and device driver utilization. After the application container profiling engine 212 has completed its evaluation of the application container, the application container is shutdown and the application container profiling environment 114 is reset to a known state to remove any system artifacts, and/or any configuration or software changes that might have occurred during the profiling process. Concurrently, the application container database 216 is updated with the newly generated application container profile at block 406.

At block 408, the application container risk calculation engine 200 parses the container profile that was generated at block 404, calculating a risk value for the application container. The risk value is a composite, quantitative value representing the degree of operational risk inherent to an application container based on the functional requirements of the application container. In this description, the functional requirements of the application container are the plurality of parameters that are measured and recorded during the application container profiling stage. Each parameter has a predefined risk value assigned to it based on but not limited to: Common Vulnerabilities and Exposures (CVE), software versions, and the inherent security built into a program, library, system call, or network protocol (i.e. secure verse insecure network protocols). Based on the different types and values of the documented parameters in the application container profile, the composite application container risk value can be different from others. For example, an application container might require the use of an insecure protocol such as FTP. Since FTP authenticates in clear text as opposed to encrypted text, the operational risk of exploitation increases while system and data integrity decreases. Due to the risks associated with FTP, this one parameter would have a higher risk value assigned to it as contrasted to another protocol such as IPSec that is more secure, and therefore would have a lower risk value assigned to the protocol. In this example, the application container risk calculation engine 200 would calculate a higher composite risk value for the application container that uses FTP as compared to another application container that is exactly identical with the exception of using the IPSec protocol rather than FTP.

Continuing at block 410, the application container risk calculation engine 200 prompts the user to input risk tolerance values, specific to the host and of the compute cluster environment for which the application container can be paired and provisioned to. The use of the user defined risk tolerances are further detailed in FIG. 5. Next at bock 412, the application container database is updated with the calculated application container risk value and the user defined risk tolerance values from blocks 408 and 410.

Figure 5:
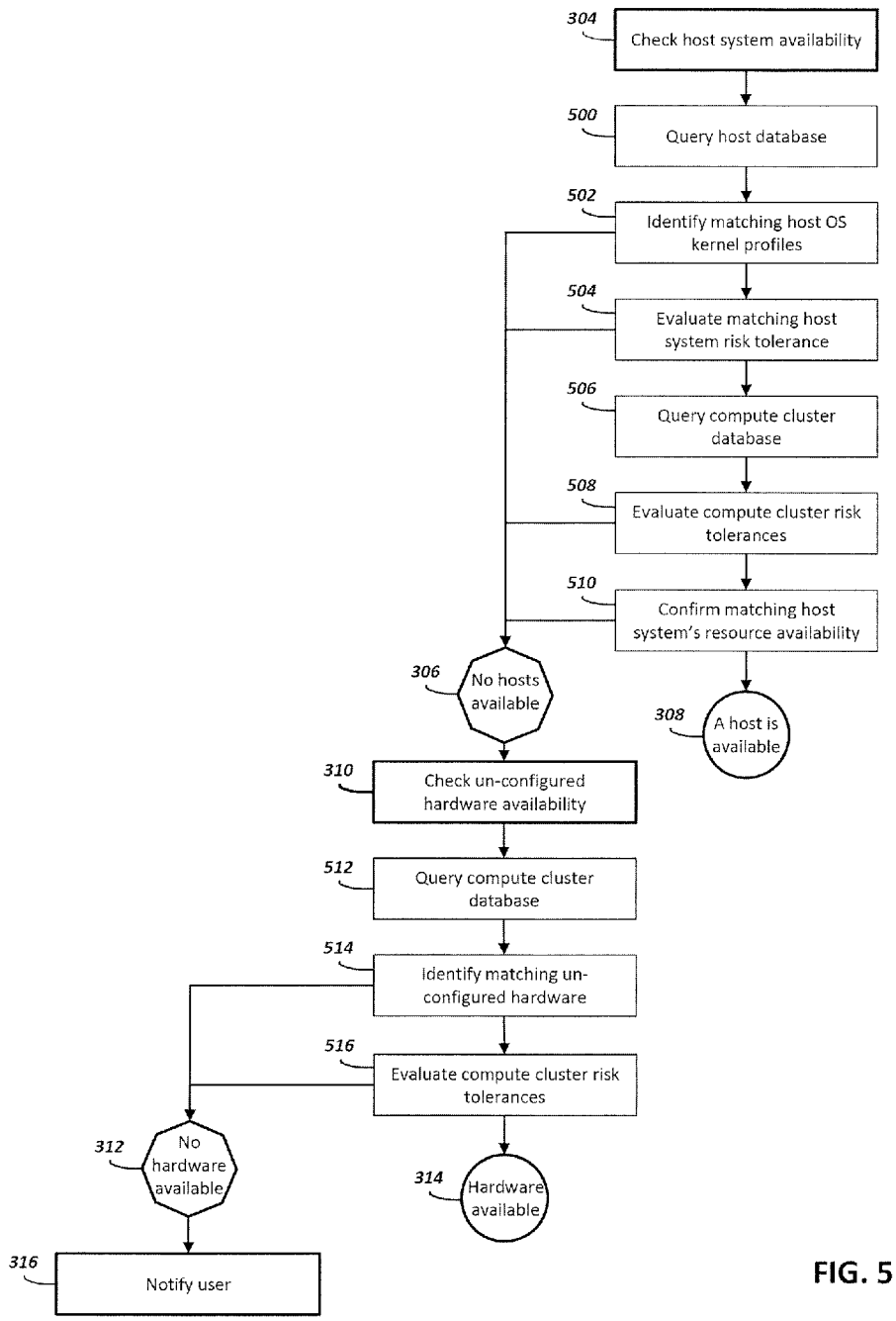
FIG. 5 is a flowchart further detailing the procedure for identifying and verifying host system availability as depicted in FIG. 3 in accordance with aspects of the invention.

FIG. 5 is a flowchart depicting the process for checking host system availability (block 304) and un-configured hardware availability (block 310). First, host system availability is assessed to identify all hosts that match (e.g. meet) the application container's operational requirements which may include operating system kernel configuration requirements, host hardware resource availability requirements, and user defined acceptable system risk value for of the application container. At block 500, the host database 222 is queried. Information specific to the configurations of all unique OS kernels installed in the compute environment 104, the individual host hardware each unique OS kernel configuration is installed on, and the composite host statistical risk analysis results for each host is amassed. This information is systematically processed at block 502 to identify all, if any, potential OS kernel configurations that match the requirements of the application container. If no OS kernels documented in the host database 222 match the application container's requirements as defined by the application container's profile information, no hosts are identified as available and the assessment of available un-configured hardware is initiated as described later on starting with block 512. If one or more installed host OS kernels of the compute environment 104 are identified as matching the application container's requirements, the physical host hardware that the OS kernels are installed on are further evaluated.

At block 504, hosts that are identified as a potential match for the application container are critiqued based on the calculated and recorded composite host risk statistical analysis results. Details of the composite host risk statistical analysis is further discussed in FIG. 7. For each individual matching host, the composite host statistical risk analysis results are contrasted to the user defined risk tolerance values for a host, as collected at block 410. If the composite host statistical risk analysis results are outside the limits set by the user (e.g. do not meet the risk value), the host is considered not acceptable and the assessment of available un-configured hardware is initiated as described later on starting with block 512. If the composite host statistical risk analysis results are within the tolerances of the application container's user defined risk tolerance values for a host (e.g. meets the risk value), the host is identified as available, and the compute cluster the host is associated with is evaluated.

At block 506, the compute cluster database 218 is queried. Information from this database enables the mapping and identification of each host to its associate compute cluster, and the collection of each associated compute clusters composite statistical risk results. At block 508, each compute clusters associated with an acceptable host system for hosting the application container are evaluated. Compute clusters associated with host systems that are identified as a potential match for the application container are assessed based on the compute clusters composite statistical risk results. Details of compute cluster composite statistical analysis is further discussed in FIG. 7. For each compute cluster associated with a potential host, the compute clusters composite statistical risk results are contrasted to the user defined risk tolerance values for a compute cluster, as collected at block 410. If the compute clusters composite statistical risk results are out of scope of the application container's user defined statistical risk tolerance values for a cluster (e.g. do not meet the risk value), the host of the compute cluster being evaluated is considered not acceptable, and the assessment of available un-configured hardware is initiated as described later on starting with block 512. If the compute clusters composite statistical risk results are within the application container's user defined statistical risk tolerance values for a cluster (e.g. meets the risk value), the host of the compute cluster is considered acceptable. At this point, if a host still considered acceptable, the host system resource availability is checked.

At block 510, the resource availability of hosts that meet the criteria of the application container are assessed. The status engine 206 of the host status and deployment module 112 communicates and coordinates with the host status engines 226, 230, 234 of each of the acceptable host systems. The host status engine probes the system it resides on, reporting back to the host status and deployment module 112 the availability of host resources. For exemplar purposes, hardware resources such as processors, processor cores, volatile and non-volatile memory, networking, etc. are checked for utilization and availability. Results from the probing are then contrasted to the application container's requirements as defined in the application container's profile. If the host being assessed meets the requirements of the application container for resources, the first acceptable host is selected for the application container to be paired and provisioned to as described in FIG. 7. If no host is identified as having available resources to host the application container, the assessment of available un-configured hardware is initiated as described with block 512.

At block 310, un-configured hardware availability is assessed. Starting with block 512, the compute cluster database 218 is queried. Information acquired from the compute cluster database 218 includes a list of all un-configured hardware configurations within the compute environment 104, and the collection of each identified compute clusters compute cluster composite statistical risk results for which the un-configured hardware is associated. At block 514, potential un-configured hardware that fulfill the application container's hardware requirements as defined in the application container's profile are identified. If no un-configured hardware meets the application container's requirements as illustrated with block 312, the user is notified at block 316 and the application container deployment process halts as previously described. If acceptable un-configured hardware is identified, its associated compute cluster is evaluated for compliance with the user defined risk tolerance values for a cluster.

At block 516, each compute cluster associated with identified potential un-configured hardware is evaluated for compliance with the user defined risk tolerance values for a compute cluster as defined in the application container profile. The compute cluster composite statistical risk results are contrasted to the user defined risk tolerance values for a compute cluster. If the compute cluster composite statistical risk results are outside of the application container's user defined risk tolerance values for a cluster, the un-configured hardware of the compute cluster being evaluated is considered not acceptable. If none of the compute clusters associated with the previously identified un-configured hardware meets the constraints of the user defined risk tolerance values for a cluster, no hardware is available as indicated by block 312. The user is notified and the application container deployment process halts as previously described. If the compute cluster associated with the un-configured hardware is within the application container's user defined risk tolerance values for a cluster, the first acceptable un-configured hardware of the compute cluster is selected, and the process of installing an OS kernel is initiated as described in FIG. 6.

Figure 6:
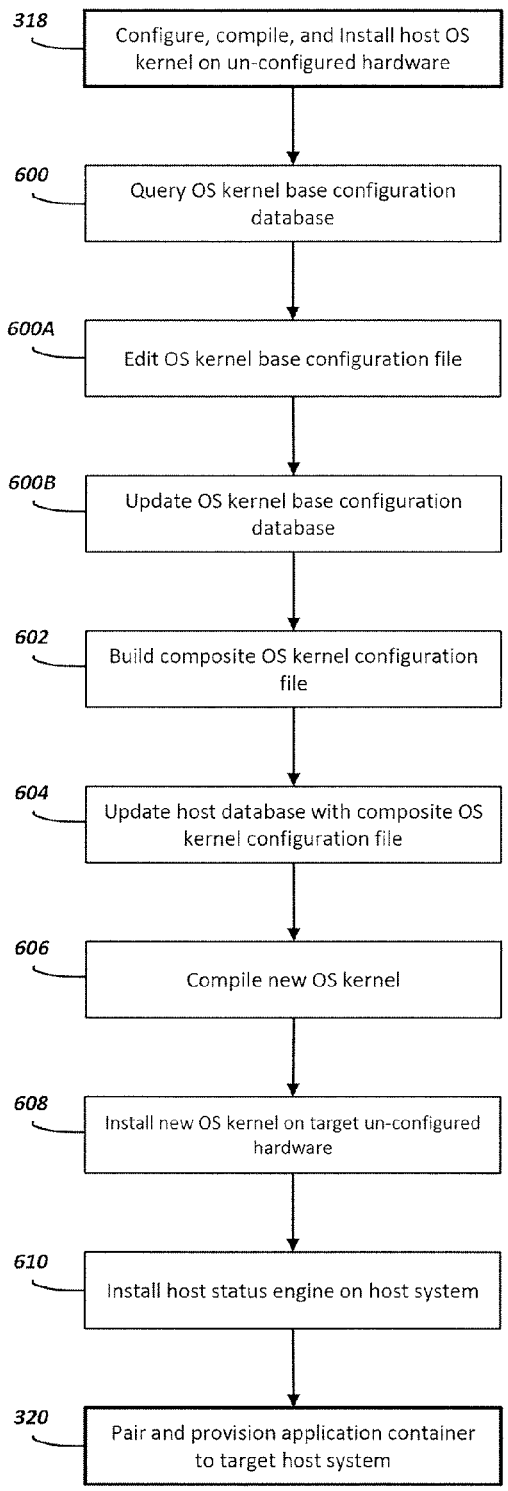
FIG. 6 is a flowchart further detailing the procedure for configuring, compiling, and installing a new host OS kernel as depicted in FIG. 3 in accordance with aspects of the invention.

FIG. 6 is a flowchart illustrating in detail the methodology for configuring, compiling, and then installing a custom configured OS kernel that matches an application container's specific configuration requirements on un-configured hardware. Starting at block 600, the OS kernel base configuration database 220 is queried for the OS kernel base configuration information. The OS kernel base configuration information provides an initial minimalist OS kernel configuration that will be further edited to include the specific requirements of the application container as recorded in the application container profile as detailed in FIG. 4. Application of this methodology reduces the overall attack surface of an OS kernel by eliminating unneeded kernel modules and configuration settings through a minimalist approach. Changes and updates to the OS kernel base configuration information occur at block 600A. If no updates are required, the process continues with block 602. At block 600A, a general user of the system can add, remove, and edit settings, modules, hardware drives, etc. of the OS kernel base configuration information file. An administrative user can perform all of the mentioned operations as well as having the privilege to manage users (i.e. adding, updating, removing) of the system or overall configurations of the system described. Changes made by a user at block 600A directly affect the OS kernel functionality, thus providing the opportunity to reduce unneeded components of the kernel, enabling a minimalist-starting configuration that in effect reduces the overall attack surface by design. If the OS kernel base configuration requires no changes, the process continues with the current OS kernel base configuration information at block 602. If an edit is made to the initial OS kernel base configuration information, the changes are written to the non-volatile memory of the OS kernel base configuration database 220 at block 600B.

At block 602, the management interface and processing module 108 initiates the host OS kernel configuration and compile engine 214 of the OS kernel configuration and compile environment 116 to parses the initial minimalist OS kernel configuration information and the application container's profile information. The host OS kernel configuration and compile engine 214 combines the two data sets to create a new composite, minimalist OS kernel configuration file that specifically supports the application container's operational requirements. At block 604, the composite OS kernel configuration file is archived and the specific un-configured hardware the new OS kernel will be installed on is recorded in the host database 222.

At block 606, the host OS kernel configuration and compile engine 214 utilizes the OS kernel configuration and compile environment 116 to compile a new host OS kernel using the composite OS kernel configuration file from block 602. Once the new OS kernel is compiled, the binary software code is transferred from the OS kernel configuration and compile environment 116 to the management interface and processing module 108. Next, the OS kernel is installed to the identified un-configured hardware by the OS kernel deployment engine 210 of the compute environment 104 as depicted in block 608. At block 610, the OS kernel deployment engine 210 installs the host status engine on the new host where the OS kernel was just installed. At this point, the newly configured host system is ready to receive the application container as further detailed in FIG. 7.

Figure 7:
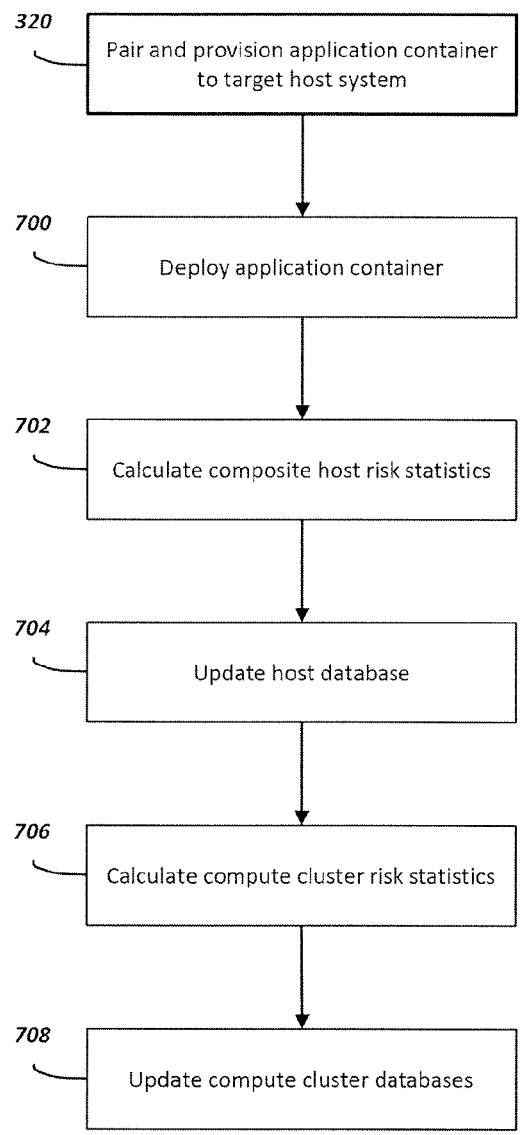
FIG. 7 is a flowchart further illustrating the procedure for intelligently pairing and provisioning an application container to an available host system of a compute cluster as depicted in FIG. 3 in accordance with aspects of the invention.

After a host machine is identified available as described at block 308 of FIG. 5, or a new host OS kernel has been installed on previously un-configured hardware as detailed in FIG. 6, the next step is pairing and provisioning the application container to the target host. FIG. 7 is a flowchart depicting the steps for deploying an application container to a host machine. At block 700, the management interface and processing module 108 securely transfers the application container image file from the storage, processing, and deployment system environment 102 to a host machine 224, or 228, or 232 of a compute cluster 122 or 124 in the compute environment 104. Once transferred to a host machine, the management interface and processing module 108 interfaces with the application container hypervisor software's API to initiate the boot up and management of the application container. Once the application container starts booting, the application container hypervisor software takes over full management of the application container.

At block 702, the composite host statistical risk analysis of the host system environment the application container was paired and provisioned to is performed. The application container database 216 is queried and each application container risk value associated with the host is pulled, including the application container that was provisioned at block 700. As a data set, the application container risk values are statistical analyzed by the host and cluster statistical risk calculation engine 204. Statistics such as, but not limited to, the mean, median, mode, standard deviation, regression, auto-correlation, etc. are calculated. At block 704, the results of the composite host risk value statistical analysis are recorded to the host database 222. Next, the compute cluster composite statistical risk results are calculated. Each host of the compute cluster, for which the application container was just provisioned in, is queried from the compute cluster database 218. Once all the associated hosts have been identified for the compute cluster, each composite host statistical risk analysis result is queried from the host database 222. The host and cluster statistical risk calculation engine 204 further analyzes the composite host risk. Statistics such as, but not limited to, the mean, median, mode, standard deviation, regression, auto-correlation, etc. are calculated. At block 708, the results of the compute cluster composite statistical risk results are recorded to the compute cluster database 218.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for application container security, the system comprising:
an application container processing and deployment computer system including a processor and a memory, the application container processing and deployment computer system configured to:
receive an application container including a software application and runtime environment files for supporting execution of the software application;
determine operating system kernel functional requirements of the application container;
calculate a risk value based on the operating system kernel functional requirements of the application container, wherein the risk value is a quantitative value determined based on functional requirements of the application container including at least one of common vulnerabilities and exposures, software versions, built-in security, libraries, system calls and network protocols;
determine availability of a host computer to host the application container, by determining if an operating system kernel of the host computer meets the operating system kernel functional requirements of the application container, the operating system kernel functional requirements including the risk value for the application container;
when the operating system kernel of the host computer is determined to be available by meeting the operating system kernel functional requirements:
pair the application container with the operating system kernel of the host computer for execution of the software application; and
when the operating system kernel of the host computer is determined to be unavailable by not meeting the operating system kernel functional requirements, the processing and deployment computer system is configured to check availability of un-configured hardware:
when hardware is available:
configure and compile a container-specific operating system kernel that meets the operating system kernel functional requirements of the application container, and
pair the application container with the container-specific operating system kernel, and
when hardware is unavailable, notify a user.

2. The system of claim 1, wherein the processing and deployment computer system is further configured to develop a profile of the application container including information for determining the operating system kernel functional requirements of the application container.

3. The system of claim 1, wherein the processing and deployment computer system is further configured to determine the availability of the host computer based on at least one of kernel configurations, host hardware resource availability, and risk rating of the host computer.

4. The system of claim 1, wherein in response to the availability of un-configured hardware of another host computer of the compute environment, the processing and deployment computer system is further configured to:
compile the container-specific operating system kernel in the operating system kernel configuration and compile environment, and
install the container-specific operating system kernel on the un-configured hardware.

5. The system of claim 1, wherein in response to determining that the host computer is available, the processing and deployment computer system is further configured to provision the application container to the available host system.

6. The system of claim 2, wherein the profile of the application container includes at least one of system calls made, types of network protocols used, processes started, memory utilization, file system requirements, and device driver utilization.

7. The system of claim 1, wherein the processing and deployment computer system is further configured to:

determine if the host computer meets the operating system kernel functional requirements based on the user defined acceptable system risk value for the application container, determine if the host computer operating system kernel meets the application container functional requirements, and determine if the host computer hardware meets the application container functional requirements.

8. The system of claim 1, wherein the operating system kernel functional requirements include at least one of an operating system kernel configuration, a host hardware resource availability or a user defined aspect of the risk value.

9. A computer-implemented method for application container security, comprising the steps of:

receiving, by a processing and deployment computer system including a processor and a memory, an application container including a software application and runtime environment files for supporting execution of the software application;

determining, by the processing and deployment computer system, operating system kernel functional requirements of the application container;

calculating, by the processing and deployment computer system, a risk value based on the operating system kernel functional requirements of the application container, wherein the risk value is a quantitative value determined based on functional requirements of the application container including at least one of common vulnerabilities and exposures, software versions, built-in security, libraries, system calls and network protocols;

determining, by the processing and deployment computer system, availability of a host computer to host the application container, by determining if an operating system kernel of the host computer meets the operating system kernel functional requirements of the application container, the operating system kernel functional requirements including the risk value for the application container;

when the operating system kernel of the host computer is determined to be available by meeting the operating system kernel functional requirements for the application container:

pairing, by the processing and deployment computer system, the application container with the operating system kernel of the host computer for execution of the software application; and when the operating system kernel of the host computer is determined to be unavailable by not meeting the operating system kernel functional requirements for the application container, the processing and deployment computer system is configured to check availability of un-configured hardware:

when hardware is available:
configuring, by the processing and deployment computer system, and compiling a container-specific operating system kernel that meets the operating system kernel functional requirements of the application container, and
pairing, by the processing and deployment computer system, the application container with the container-specific operating system kernel, and when hardware is unavailable, notify a user.

10. The method of claim 9, further comprising:
developing, by the processing and deployment computer system, a profile of the application container including information for determining the operating system kernel functional requirements of the application container.

11. The method of claim 9, further comprising:
determining, by the processing and deployment computer system, the availability of the host computer based on at least one of kernel configurations, host hardware resource availability, and system risk rating of the host computer.

12. The method of claim 9, further comprising:
in response to the availability of un-configured hardware of another host computer of the compute environment, compiling, in the operating system kernel configuration and compile environment, an operating system kernel, and installing the container-specific operating system kernel on the un-configured hardware.

13. The method of claim 9, further comprising:
in response to determining that the host computer is available, provisioning, by the processing and deployment computer system, the application container to the available host system.

14. The method of claim 10, wherein the profile of the application container includes at least one of system calls made, types of network protocols used, processes started, memory utilization, file system requirements, and device driver utilization.

15. The method of claim 9, further comprising:
determining, by the processing and deployment computer system, if the host computer meets the requirements based on a user defined acceptable system risk value for the application container,
determining if the host computer operating system kernel meets the application container functional requirements, and
determining if the host computer hardware meets the application container functional requirements.

16. The method of claim 9, wherein the operating system kernel functional requirements include at least one of an operating system kernel configuration, a host hardware resource availability or a user defined aspect of the risk value.

* * * * *